United States Patent
Lin (10) Patent No.: US 10,447,766 B2
(45) Date of Patent: *Oct. 15, 2019

(54) INFORMATION SHARING METHOD AND SYSTEM

(71) Applicant: TENCENT TECHNOLOGY (SHENZHEN) COMPANY LIMITED, Shenzhen (CN)

(72) Inventor: Xiaodan Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/007,673

(22) Filed: Jun. 13, 2018

(65) Prior Publication Data

US 2018/0295178 A1    Oct. 11, 2018

Related U.S. Application Data (63) Continuation of application No. 14/371,999, filed on Jul. 11, 2014, now Pat. No. 10,063,620, which is a (Continued)

(30) Foreign Application Priority Data

Mar. 15, 2013 (CN) .......................... 2013 1 0084264

(51) Int. Cl.
*H04L 29/08* (2006.01)
*G06F 17/30* (2006.01)
(Continued)

(52) U.S. Cl.
CPC ............ *H04L 67/06* (2013.01); *G06F 16/183* (2019.01); *G06F 16/9554* (2019.01); *H04L 65/403* (2013.01)

(58) Field of Classification Search
CPC ... H04L 67/06; H04L 65/403; G06F 16/9554; G06F 16/183; G06F 16/1834;
(Continued)

(56) References Cited

U.S. PATENT DOCUMENTS 6,324,522 B2 * 11/2001 Peterson ................ G06Q 10/08
705/22
8,385,589 B2 * 2/2013 Erol ..................... G06F 16/5846
382/100

(Continued)

FOREIGN PATENT DOCUMENTS

CN          102394926          3/2012
CN          102833353          12/2012
(Continued)

OTHER PUBLICATIONS

Search Report and Office Action issued by the State Intellectual Property Office of the Peoples Republic of China dated Sep. 4, 2017 for Chinese Application No. 201310084264.5.

(Continued)

*Primary Examiner* — Kostas J Katsikis
(74) *Attorney, Agent, or Firm* — Oblon, McClelland, Maier & Neustadt, L.L.P.

(57) ABSTRACT

An information sharing method and the system thereof are provided. The method includes obtaining an information exported file by exporting the information to be shared, and storing the information exported file according to an assigned network address; generating a two-dimensional code according to the network address of the stored information exported file; sharing the generated two-dimensional code, and importing the information exported file by scanning the shared two-dimensional code. The system include an export processing module, a two-dimensional code generating module, a two-dimensional code sharing module,
(Continued)

and an importing module. By the above method and system, the operation will be more convenient.

15 Claims, 5 Drawing Sheets

Related U.S. Application Data continuation of application No. PCT/CN2013/090038, filed on Dec. 20, 2013.

(51) Int. Cl.
*H04L 29/06* (2006.01)
*G06F 16/182* (2019.01)
*G06F 16/955* (2019.01)

(58) Field of Classification Search
CPC ............... G06F 16/1837; G06F 16/184; G06F 16/1844; G06F 16/381; G06F 17/30203; G06F 17/30879
See application file for complete search history.

(56) References Cited

U.S. PATENT DOCUMENTS

| | | | | |
|---|---|---|---|---|
| 9,225,519 | B1* | 12/2015 | Fraccaroli | ............ G06F 16/381 |
| 9,378,386 | B1 | 6/2016 | Saylor | |
| 9,641,575 | B2 | 5/2017 | Le Huerou | |
| 9,667,716 | B2 | 5/2017 | Eggert | |
| 10,063,620 | B2* | 8/2018 | Lin | ........ H04L 65/403 |
| 2002/0078102 | A1 | 6/2002 | Dutta | |
| 2005/0289237 | A1 | 12/2005 | Matsubara | |
| 2007/0019232 | A1 | 1/2007 | Kano | |
| 2008/0091812 | A1 | 4/2008 | Lev-Ran et al. | |
| 2008/0270233 | A1 | 10/2008 | Yip | |
| 2009/0190171 | A1 | 7/2009 | Nemoto | |
| 2011/0093941 | A1 | 4/2011 | Liu | |
| 2011/0119075 | A1 | 5/2011 | Dhoble | |
| 2011/0157642 | A1 | 6/2011 | Nemoto | |
| 2011/0309148 | A1 | 12/2011 | Matsuda | |
| 2012/0179572 | A1 | 7/2012 | Hesse | |
| 2012/0226990 | A1 | 9/2012 | Nakashima | |
| 2012/0271712 | A1* | 10/2012 | Katzin | ............ G06Q 30/06 705/14.51 |
| 2013/0043302 | A1* | 2/2013 | Powlen | ............ G06F 16/381 235/375 |
| 2013/0073685 | A1 | 3/2013 | Isaza | |
| 2013/0140355 | A1* | 6/2013 | Qu | ............ G06Q 30/02 235/375 |
| 2013/0226958 | A1* | 8/2013 | Pianko | ............ G06F 16/2455 707/769 |
| 2013/0262686 | A1 | 10/2013 | Hill | |
| 2013/0290203 | A1 | 10/2013 | Purves | |
| 2013/0335582 | A1 | 12/2013 | Itasaki | |
| 2013/0346302 | A1 | 12/2013 | Purves | |
| 2014/0026048 | A1 | 1/2014 | Spirer | |
| 2014/0052617 | A1 | 2/2014 | Chawla | |
| 2014/0108559 | A1 | 4/2014 | Grochowicz | |
| 2014/0203071 | A1 | 7/2014 | Eggert | |
| 2014/0325328 | A1* | 10/2014 | Beadles | ............ G06F 17/2235 715/208 |
| 2014/0351335 | A1 | 11/2014 | Le Huerou | |
| 2014/0366091 | A1 | 12/2014 | Savage | |
| 2015/0008256 | A1 | 1/2015 | Beadles | |
| 2015/0088607 | A1 | 3/2015 | Georgoff | |
| 2015/0112774 | A1 | 4/2015 | Georgoff | |
| 2015/0113042 | A1* | 4/2015 | Gonzalez, Jr. | ............ H04L 67/10 709/203 |
| 2015/0134431 | A1 | 5/2015 | Georgoff | |
| 2015/0160909 | A1* | 6/2015 | Ding | ............ G06F 3/1423 345/1.1 |
| 2015/0215372 | A1* | 7/2015 | Lin | ............ H04L 65/403 709/204 |
| 2015/0288779 | A1 | 10/2015 | Okumura | |
| 2015/0296031 | A1 | 10/2015 | Miyazaki | |
| 2015/0304369 | A1* | 10/2015 | Sandholm | ............ G06Q 10/10 715/753 |
| 2016/0044071 | A1 | 2/2016 | Sandholm | |
| 2016/0212178 | A1 | 7/2016 | Zhang | |
| 2016/0253710 | A1 | 9/2016 | Publicover | |
| 2017/0185596 | A1 | 6/2017 | Spirer | |
| 2017/0228711 | A1 | 8/2017 | Chawla | |
| 2017/0243533 | A1 | 8/2017 | Trachtenberg | |
| 2017/0272426 | A1 | 9/2017 | Wertz | |
| 2017/0300196 | A1* | 10/2017 | Simpson | ............ G06F 3/0482 |
| 2017/0300793 | A1* | 10/2017 | Wang | ............ G06K 19/06037 |
| 2018/0234496 | A1* | 8/2018 | Ratias | ............ H04L 67/22 |
| 2018/0295178 | A1* | 10/2018 | Lin | ............ H04L 65/403 |

FOREIGN PATENT DOCUMENTS

| | | |
|---|---|---|
| CN | 102902761 | 1/2013 |
| JP | 2011-150647 | 8/2011 |

OTHER PUBLICATIONS

International Search Report and Written Opinion in PCT/CN2013/090038 dated Mar. 20, 2014.
Office Action dated Apr. 10, 2018 in Chinese Patent Application No. 201310084264.5, with partial English translation, 7 pages.
Li-Guo Wang, et al., "The System of Certification Based on SMS and QR Code", Shandong Electronics, vol. 2, with English abstract, pp. 42-44.

* cited by examiner

INFORMATION SHARING METHOD AND SYSTEM

CROSS REFERENCE TO RELATED APPLICATIONS

This application is a continuation application of U.S. application Ser. No. 14/371,999, filed on Jul. 11, 2014, which is a continuation application of the PCT International Application No. PCT/CN2013/090038, filed on Dec. 20, 2013, entitled "INFORMATION SHARING METHOD AND SYSTEM" by Xiaodan LIN, which claims the priority from the Chinese Patent Application No. CN 201310084264.5, filed on Mar. 15, 2013. The above-referenced applications are hereby incorporated herein in their entireties by reference.

FIELD OF THE INVENTION

The present disclosure relates generally to the field of Internet application technology, and more particularly to an information sharing method and the system thereof.

BACKGROUND OF THE INVENTION

With the development of network application, people can share different kinds of information with the other users via the Internet. For example, using social networking tools, a user can share the information that is just obtained by releasing micro-blog or log, or showing the applied network applications. In addition, the user can also share with the other users the information stored in the terminal device currently in use, such as bookmark collected by the browser and contact information, etc.

Generally, the traditional information sharing involves uploading the information, such as bookmark collection and contact information that are stored in the terminal device, and sharing the network addresses of the uploaded information with the other users by social networking tools, e-mail or in other forms.

However, in traditional ways, the other users can only obtain the shared information upon logging in to appropriate social networking tool or mailbox to obtain the shared network address. As a result, the operation is relatively cumbersome.

SUMMARY OF THE INVENTION

To address the aforementioned deficiencies and inadequacies, there is a need to provide an information sharing method, system and non-transitory computer-readable storage medium comprising an executable program to execute an information sharing method, which can simplify the operation.

According to one aspect of the disclosure, an information sharing method includes the steps of:

obtaining an information exported file by exporting the information to be shared, and storing the information exported file according to an assigned network address;

generating a two-dimensional code according to the network address of the stored information exported file;

sharing the generated two-dimensional code;

importing the information exported file by scanning the shared two-dimensional code.

According to a further aspect of the disclosure, an information sharing system includes:

an export processing module, configured to obtain an information exported file by exporting the information to be shared, and to store the information exported file according to an assigned network address;

a two-dimensional code generating module, configured to generate a two-dimensional code according to the network address of the stored information exported file;

a two-dimensional code sharing module, configured to share the generated two-dimensional code;

an importing module, configured to import, by scanning the shared two-dimensional code, the information exported file.

According to still a further aspect of the disclosure, a non-transitory computer-readable storage medium comprising an executable program to execute an information sharing method, the method including:

obtaining an information exported file by exporting the information to be shared, and storing the information exported file according to an assigned network address;

generating a two-dimensional code according to the network address of the stored information exported file;

sharing the generated two-dimensional code; and importing the information exported file by scanning the shared two-dimensional code.

By the above information sharing method and system, an information exported file is obtained by exporting the information to be shared, and stored to an assigned network address. Further, a two-dimensional code is generated according to the network address. Thus, information importing and sharing are realized by the two-dimensional code. When importing the information to be shared, the user only needs to scan the corresponding two-dimensional code, instead of logging into respective social networking tools or mailbox. This greatly simplifies the operation compared with the prior art.

DETAILED DESCRIPTION OF THE PREFERRED EMBODIMENTS

In the following description of embodiments, reference is made to the accompanying drawings which form a part hereof, and in which it is shown by way of illustration specific embodiments of the disclosure that can be practiced. It is to be understood that other embodiments can be used and structural changes can be made without departing from the scope of the disclosed embodiments.

Figure 1:
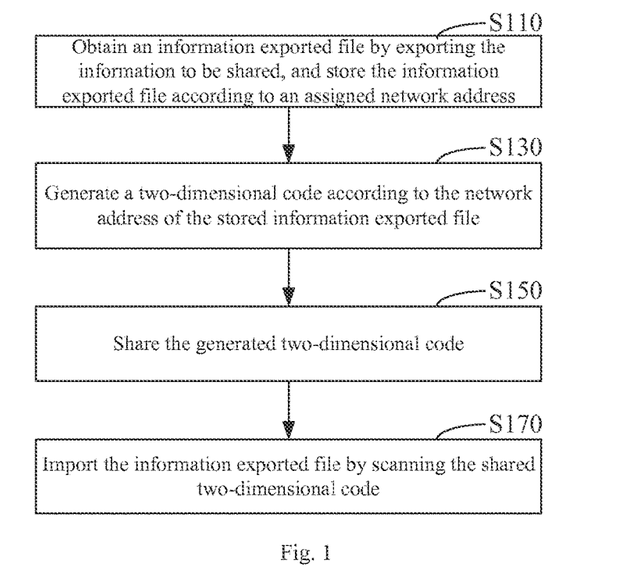
FIG. 1 is a flowchart in accordance with an information sharing method in accordance with an aspect of the disclosure.

As illustrated in FIG. 1, an information sharing method includes the following steps.

Step S110, obtaining an information exported file by exporting the information to be shared, and storing the information exported file according to an assigned network address.

In one embodiment, the information to be shared can be bookmarks collected by the browser, or contact information in the address book, etc., which is exported in specific file formats. For example, when sharing the bookmarks collected by the browser, the bookmarks are exported as information exported file in html format. By the information exported file, information to be shared can be packaged, so as to perform information processing and sharing more conveniently.

Upon obtaining the information exported file by exporting the information to be shared, the information exported file will be assigned with a network address. Then, after obtaining the network address for storing the information exported file, the information exported file can be stored in the network address.

Step S130, generating a two-dimensional code according to the network address of the stored information exported file.

In one embodiment, a two-dimensional code is a black and white graph distributed as a specific geometry according to certain rules in the plane (two-dimensional directions), which is used to record information of data and symbols. It includes code systems of Data Matrix, Maxi Code, Aztec, QR Code, Vericode, PDF417, Ultracode, Code 49 and Code 16K, etc.

The corresponding two-dimensional code can be generated based on the network address of the stored information exported file by performing the processes including: data analysis, data coding, error correction coding, constructing the final data, constructing the matrix, mask graphics application, generating formats and version information, etc.

Step S150, sharing the generated two-dimensional code.

In one embodiment, the generated two-dimensional code can be issued so as to display to the other user, informing the other user that the information is currently shared. By the issued two-dimensional code, information being shared can be obtained.

A two-dimensional code can be shared in a variety of ways. For example, simply show the generated two-dimensional code, or spread it by instant messaging or social networking tools, such as micro-blog, blog, mailbox, etc. Some other ways and channels are also possible, which will not go detail here.

Step S170, importing, by scanning the shared two-dimensional code, the information exported file.

In one embodiment, in order to obtain the shared information, the user can scan the displayed two-dimensional code to download the shared information exported file, and import the information exported file. For example, when the information shared is a bookmark collected by the browser, the information exported file downloaded by scanning the shared two-dimensional code may be a collection of multiple bookmarks. By importing the downloaded information exported file through the browser, the user can view the shared bookmarks in the browser.

In one embodiment, the method further includes, before the above Step S110, obtaining an information share command, and obtaining the information to be shared according to the information share command.

In one embodiment, information sharing includes obtaining the information share command triggered by the user, and determining the information that are needed to be shared by the user, i.e., information to be shared by the user according to the information share command.

Figure 2:
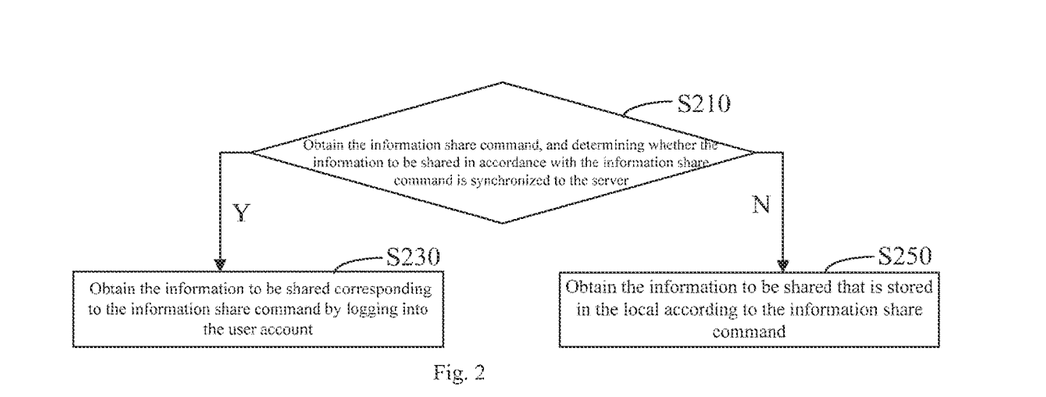
FIG. 2 is a flowchart illustrating a method for obtaining an information sharing command, and obtaining the information to be shared according to the information sharing command in accordance with an aspect of the disclosure.

As illustrated in FIG. 2, in one embodiment, the above step of obtaining the information share command and obtaining the information to be shared according to the information share command further includes:

Step S210, obtaining the information share command, and determining whether the information to be shared in accordance with the information share command is synchronized to the server; if yes, then perform Step S230, and if not, then perform Step S250.

In the embodiment, the method includes obtaining the information share command that is triggered by the user in the display interface, and determining whether the terminal device has enabled the information synchronization or backup function. If yes, then indicate that the information to be shared corresponding to the information share command has been synchronized to the server, and if not, then indicate that the information to be shared is just stored in the local.

Step S230, logging in to the user account to obtain the information to be shared corresponding to the information share command.

In the embodiment, when it is determined that the information to be shared corresponding to the information share command has been synchronized to the server, then obtain the user account to log in, and obtain the information to be shared corresponding to the information share command in accordance with the user account.

For example, when successfully logged in upon verification of the user account, it can be seen that the user account currently logged in corresponds to a variety of information. Thus, it is necessary to find the information to be shared corresponding to the information share command owned by the user account based on the user account and information share command.

Figure 3:
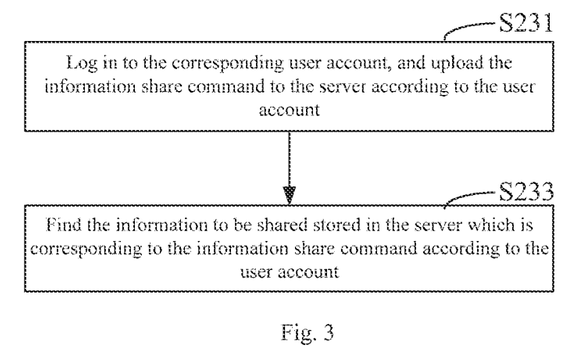
FIG. 3 is a flowchart illustrating a method of FIG. 2 for obtaining, by logging into the user's account, the information to be shared corresponding to the information sharing command.

As illustrated in FIG. 3, in one embodiment, the above Step S230 includes:

Step S231, logging in to the corresponding user account, and uploading the information share command to the server according to the user account.

In the embodiment, by logging in to the user account that triggers the information share command, the information share command is uploaded to the server.

Step S233, finding the information to be shared stored in the server which is corresponding to the information share command according to the user account.

In the embodiment, the information to be shared in accordance with the user account currently logged in to is found. The information to be shared that is found is the same with the information selected to share by the information share command triggered in the local.

Upon obtained, the information to be shared that is stored in the server can be directly exported, so as to obtain the information exported file. The information exported file can be assigned with a network address and stored therein.

Since the synchronization or backup function of the terminal device is enabled, the information to be shared stored in the server is uploaded to the server by a local terminal mostly in wifi environment. Thus, it is not required to upload again in the information sharing process. As a result, it will not additionally consume network access traffic of the terminal equipment, saving the cost of information sharing.

Step S250, obtaining the information to be shared that is stored in the local according to the information share command.

In the embodiment, when it is determined that the information to be shared corresponding to the information share command has not yet been synchronized to the server, then extract directly and locally the shared information in the terminal equipment.

Figure 4:
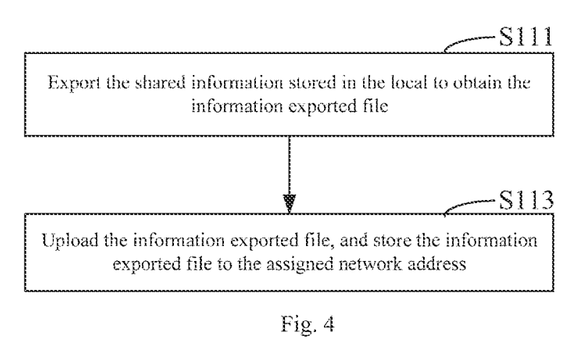
FIG. 4 is a flowchart illustrating a method for obtaining an information exported file by exporting the information to be shared, and storing the information exported file according to an assigned network address in accordance with an aspect of the disclosure.

As illustrated in FIG. 4, in one embodiment, the above Step S110 includes:

Step S111, exporting the shared information stored in the local to obtain the information exported file.

In the embodiment, the shared information locally received by the terminal device is exported to obtain the corresponding information exported file.

Step S113, uploading the information exported file, and storing it to the assigned network address.

In the embodiment, upon obtaining the information exported file corresponding to the information share command, the assigned network address will be obtained. The information exported file may be uploaded and stored in the assigned network address.

To share information that is stored in the local, it is not required to trigger the information share command. The user may log in to the user account, and obtain the information to be shared in the server by looking for the information stored in the server. The user will only need to scan the corresponding two dimension code. This will simplify the information sharing operations, and improve the ease of information sharing.

Figure 5:
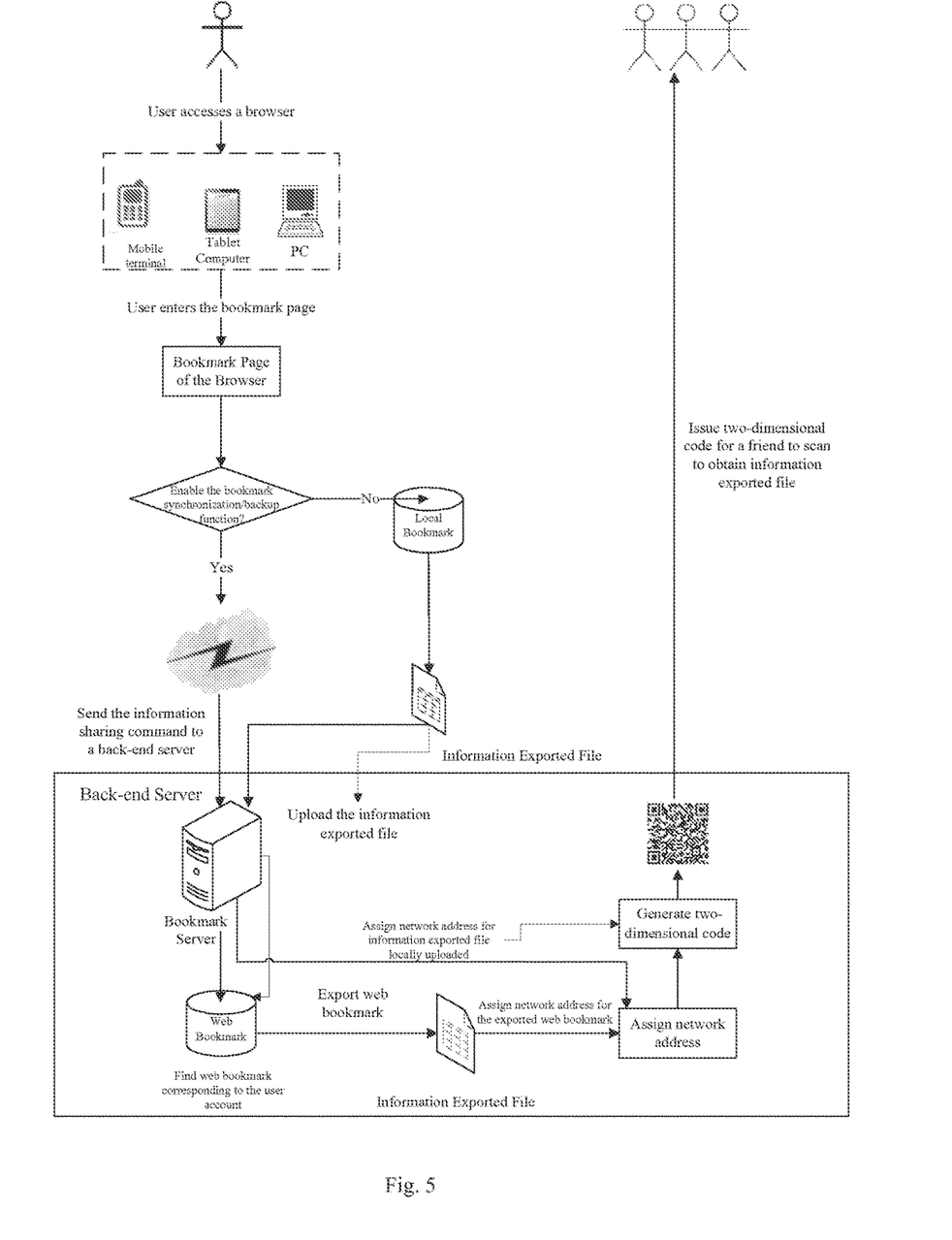
FIG. 5 is a diagram illustrating the application of an information sharing method in accordance with an aspect of the disclosure.

The above information sharing method may be better illustrated in combination with a detailed embodiment. In the embodiment, the information to be shared is the bookmark collected by the browse. As illustrated in FIG. 5, the user can run the browser in a mobile terminal, a tablet or a PC (personal computer) and other terminal devices, and go to the browser's bookmark page to trigger the information share command directed to the bookmark in the browser's bookmark page.

Upon obtaining the information sharing command trigger by the user, whether the browser has enabled the bookmark synchronization or backup function may be determined. If yes, then perform authentication and log in to the user account, and send the triggered information share command to the back-end server after a successful login.

When the back-end bookmark server receives the information sharing command, the stored web bookmarks will be looked up to obtain the web bookmarks corresponding to the user account currently logged in to, which will be exported to obtain an information exported file in html format.

When it is determined that the browser has not enabled the bookmark synchronization or backup function, then the local bookmarks are obtained and exported to obtain an information exported file in html format, which may be uploaded to the bookmark server of the back-end server.

For both the uploaded information exported file and the information exported file exported by the bookmark server, allocation of network address will be performed, and the information exported file can be stored in the assigned network address.

A two-dimensional code is generated according the assigned network address and issued, such that other users can download the information exported file by scanning the issued two-dimensional code and import it into the browser.

For traditional bookmark sharing, for example, using social networking tools to share the bookmark, website providing with web bookmark services should establish contact with the social networking tool and perform authorization.

Most of the bookmark sharing process in the art involves exporting the local bookmarks, and uploading them by logging in to a web site providing services of web bookmarks. The user's friends will have to log in with social networking tools to obtain the shared bookmark.

However, the above bookmark sharing process does not require these complex operations, which greatly facilitates the users to share information, and improves the flexibility of information sharing.

Figure 6:
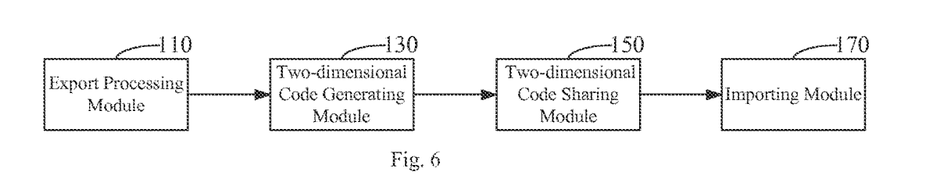
FIG. 6 is a structural schematic diagram illustrating an information sharing system in accordance with an aspect of the disclosure.

As illustrated in FIG. 6, in one embodiment, an information sharing system includes an export processing module 110, a two-dimensional code generating module 130, a two-dimensional code sharing module 150 and an importing module 170.

The export processing module 110 is configured to obtain an information exported file by exporting the information to be shared, and to store the information exported file according to an assigned network address.

In one embodiment, the information to be shared can be bookmarks collected by the browser, or contact information in the address book, etc. The information to be shared is exported by the export processing module 110 in specific file formats. For example, when sharing the bookmarks collected by the browser, the bookmarks are exported by the export processing module 110 as information exported file in html format. By the information exported file, information to be shared can be packaged, so as to perform information processing and sharing more conveniently.

Upon obtaining the information exported file by exporting the information to be shared by the export processing module 110, the information exported file will be assigned a network address. Then, after obtaining the network address for storing the information exported file, the information exported file can be stored in the network address.

The two-dimensional code generating module 130 is configured to generate a two-dimensional code according to the network address of the stored information exported file.

In one embodiment, a two-dimensional code is a black and white graph distributed as a specific geometry according to certain rules in the plane (two-dimensional directions), used for recording information of data and symbols. It includes code systems of Data Matrix, Maxi Code, Aztec, QR Code, Vericode, PDF417, Ultracode, Code 49 and Code 16K, etc.

The corresponding two-dimensional code can be generated based on the network address of the stored information exported file by the two-dimensional code generating module 130 by performing the processes including: data analysis, data coding, error correction coding, constructing the final data, constructing the matrix, mask graphics application, generating formats and version information, etc.

The two-dimensional code sharing module 150 is configured to share the generated two-dimensional code.

In one embodiment, the generated two-dimensional code can be issued by the two-dimensional code sharing module 150 so as to display to the other user, informing the other user that the information is currently shared. By the issued two-dimensional code, information being shared can be obtained.

A two-dimensional code can be shared by the two-dimensional code sharing module 150 in a variety of ways. For example, simply show the generated two-dimensional code, or spread it by instant messaging or social networking tools, such as micro-blog, blog, mailbox, etc. Some other ways and channels are also possible, which will not go detail here.

The importing module 170 is configured to import, by scanning the shared two-dimensional code, the information exported file.

In one embodiment, in order to obtain the shared information, the displayed two-dimensional code can be scanned by the importing module 170, so as to download the shared information exported file, and import the information exported file. For example, when the information shared is a bookmark collected by the browser, the information exported file downloaded by the importing module 170 scanning the shared two-dimensional code may be a collection of multiple bookmarks. By importing the downloaded information exported file through the browser, the user can view the shared bookmarks in the browser.

In one embodiment, the above information sharing system further includes a command processing module, which is configured to obtain an information share command, and to obtain the information to be shared according to the information share command.

In one embodiment, the command processing module is configured to obtain the information share command triggered by the user, and to determine the information to be shared by the user according to the information share command.

Figure 7:
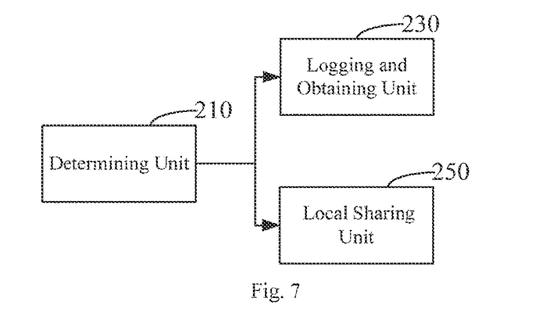
FIG. 7 is a structural schematic diagram illustrating a command processing module in accordance with an aspect of the disclosure.

As illustrated in FIG. 7, the above command processing module includes a determining unit 210, a logging and obtaining unit 230 and a local sharing unit 250.

The determining unit 210 is configured to obtain the information sharing command, and to determine whether the information to be shared corresponding to the information share command is stored in the server; if yes, then inform the logging and obtaining unit 230, and if not, inform the local sharing unit 250.

In one embodiment, the determining unit 210 is configured to obtain the information share command that is triggered by the user in the display interface, and to determine whether the terminal device has enabled the information synchronization or backup function. If yes, then indicate that the information to be shared corresponding to the information share command has been synchronized to the server, and if not, then indicate that the information to be shared is just stored in the local.

The logging and obtaining unit 230 is configured to obtain the information to be shared corresponding to the information share command by logging in to the user account.

In one embodiment, when it is determined that the information to be shared corresponding to the information share command has been synchronized to the server, the logging and obtaining unit 230 may obtain the user account to log in, and obtain the information to be shared corresponding to the information share command in accordance with the user account.

For example, when successfully logged in upon verification of the user account, it can be seen that the user account currently logged in corresponds to a variety of information. Thus, it is necessary for the logging and obtaining unit 230 to find the information to be shared corresponding to the information share command owned by the user account based on the user account and information share command.

The local sharing unit 250 is configured to obtain the information to be shared that is stored in the local according to the information sharing command.

In one embodiment, when it is determined that the information to be shared corresponding to the information share command has not yet been synchronized to the server, then the local sharing unit 250 may extract directly and locally the shared information in the terminal equipment.

Figure 8:
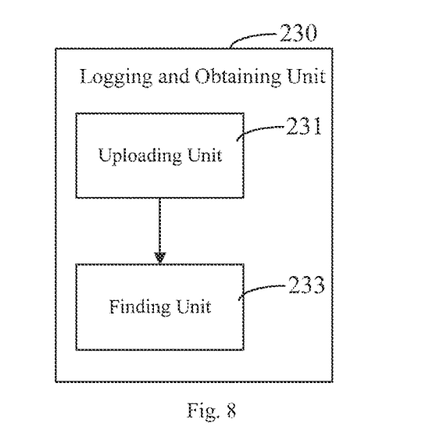
FIG. 8 is a structural schematic diagram illustrating a logging and obtaining module of FIG. 7.

As illustrated in FIG. 8, in one embodiment, the above logging and obtaining unit 230 includes an uploading unit 231 and a finding unit 233.

The uploading unit 231 is configured to log in to the corresponding user account, and to upload the information share command to the server according to the user account.

In the embodiment, the uploading unit 231 may trigger the information share command by logging in to the user account, so as to upload to the server the information share command.

The finding unit 233 is configured to find the information to be shared stored in the server which is corresponding to the information share command according to the user account.

In the embodiment, the finding unit 233 may find the information to be shared in accordance with the user account currently logged in to. The information to be shared that is found is the same with the information selected to share by the information share command triggered in the local.

Upon obtained, the finding unit 233 may directly export the information to be shared that is stored in the server, so as to obtain the information exported file. The information exported file can be assigned with a network address and stored.

Since the synchronization or backup function of the terminal device is enabled, the information to be shared stored in the server is uploaded to the server by a local terminal mostly in wifi environment. Thus, it is not required to upload again in the information sharing process. As a result, it will not additionally consume network access traffic of the terminal equipment, saving the cost of information sharing.

Figure 9:
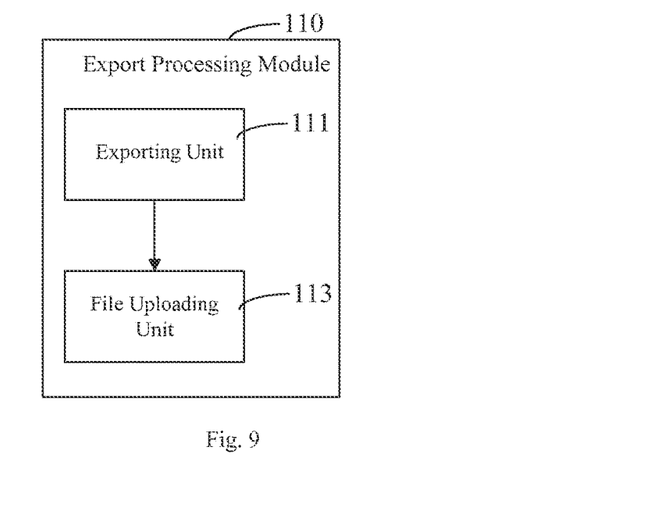
FIG. 9 is a structural schematic diagram illustrating an exporting module in accordance with an aspect of the disclosure.

As illustrated in FIG. 9, in one embodiment, the above export processing module 110 includes an exporting unit 111 and a file uploading unit 113.

The exporting unit 111 is configured to export the shared information stored in the local to obtain the information exported file.

In the embodiment, the shared information locally received by the terminal device is exported by the exporting unit 111 to obtain the corresponding information exported file.

The file uploading unit 113 is configured to upload the information exported file, and store it to the assigned network address.

In the embodiment, upon obtaining the information exported file corresponding to the information share command, the assigned network address will be obtained by the file uploading unit 113. The information exported file may be uploaded and stored in the assigned network address.

To share information that is stored in the local, it is not required to trigger the information share command. The user may log in to the user account, and obtain the information to be shared in the server by looking for the information stored in the server. The user will only need to scan the corresponding two dimension code. This will simplify the information sharing operations, and improve the ease of information sharing.

By the above information sharing method and system, an information exported file is obtained by exporting the information to be shared, and stored to an assigned network address. Further, a two-dimensional code is generated according to the network address. Thus, information importing and sharing are realized by the two-dimensional code. When importing the information to be shared, the user only needs to scan the corresponding two-dimensional code, instead of logging into respective social networking tools or mailbox. This greatly simplifies the operation compared with the prior art.

It should be noted that for a person skilled in the art, partial or full process to realize the methods in the above embodiments can be accomplished by related hardware instructed by a computer program, the program can be stored in a computer readable storage medium and the program can include the process of the embodiments of the above methods. Wherein, the storage medium can be a disk, a light disk, a Read-Only Memory or a Random Access Memory, etc.

The embodiments are chosen and described in order to explain the principles of the disclosure and their practical application so as to allow others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. An electronic device of a client for an information sharing system, comprising:
processing circuitry configured to:
trigger a command to share collected information including at least bookmarks and contact information with another electronic device of another client;
when a backup function of the electronic device is enabled, send the command to a back-end server to obtain the collected information from the back-end server;
when the backup function of the electronic device is disabled, extract the collected information locally from the electronic device and send the collected information to the back-end server, wherein the back-end server generates an exported file based on the collected information to be shared, assigns a network address to the exported file, stores the exported file according to the assigned network address; and
share a two-dimensional code according to the assigned network address of the exported file with the other electronic device, wherein the other electronic device imports the exported file by using the two-dimensional code shared by the electronic device, instead of logging into respective social networking tools or mailbox, for viewing the information to be shared.

2. The electronic device of claim 1, wherein the processing circuitry is thither configured to collect the information including the at least bookmarks and contact information.

3. The electronic device of claim 1, wherein the processing circuitry is further configured to generate the two-dimensional code according to the assigned network address of the exported file.

4. The electronic device of claim 1, wherein when the backup function of the electronic device is enabled, the back-end server logs in to a user account of the client, and uploads the command to the back-end server according to the user account, and finds the information to be shared that is stored in the back-end server which is corresponding to the command according to the user account.

5. The electronic device of claim 1, wherein when the backup function of the electronic device is disabled, the processing circuitry is further configured to:
export the information to be shared that is stored in the electronic device to obtain the exported file; and
upload the exported file, and store the exported file to the assigned network address.

6. A method for an information sharing system, the method comprising:
triggering, by an electronic device of a client, a command to share collected information including at least bookmarks and contact information with another electronic device of another client;
when a backup function of the electronic device is enabled, sending the command to a back-end server to obtain the collected information from the back-end server;
when the backup function of the electronic device is disabled, extracting the collected information locally from the electronic device and sending the collected information to the back-end server, wherein the back-end server generates an exported file based on the collected information to be shared, assigns a network address to the exported file, stores the exported file according to the assigned network address; and
sharing, by the electronic device, a two-dimensional code according to the assigned network address of the exported file with the other electronic device, wherein the other electronic device imports the exported file by using the two-dimensional code shared by the electronic device, instead of logging into respective social networking tools or mailbox, for viewing the information to be shared.

7. The method of claim 6, further comprising:
collecting, by the electronic device, the information including the at least bookmarks and contact information.

8. The method of claim 6, further comprising:
generating, by the electronic device, the two-dimensional code according to the assigned network address of the exported file.

9. The method of claim 6, wherein when the backup function of the electronic device is enabled, further comprising:
by the back-end server,
logging in to a user account of the client;
uploading the command to the back-end server according to the user account; and
finding the information to be shared that is stored in the back-end server which is corresponding to the command according to the user account.

10. The method of claim 6, wherein when the backup function of the electronic device is disabled, further comprising:
exporting the information to be shared that is stored in the electronic device to obtain the exported file; and uploading the exported file, and store the exported file to the assigned network address.

11. A non-transitory computer-readable storage medium comprising a plurality of instructions, the instructions to be executed for performing an information sharing method, the method comprising:
   triggering a command to share collected information including at least bookmarks and contact information with another electronic device of another client;
   when a backup function of the electronic device is enabled, sending the command to a back-end server to obtain the collected information from the back-end server;
   when the backup function of the electronic device is disabled, extracting the collected information locally from the electronic device and sending the collected information to the back-end server, wherein the back-end server generates an exported file based on the collected information to be shared, assigns a network address to the exported file, stores the exported file according to the assigned network address; and
   sharing a two-dimensional code according to the assigned network address of the exported file with the other electronic device, wherein the other electronic device imports the exported file by using the two-dimensional code shared by the electronic device, instead of logging into respective social networking tools or mailbox, for viewing the information to be shared.

12. The non-transitory computer-readable storage medium of claim 11, further comprising:
   collecting the information including the at least bookmarks and contact information.

13. The non-transitory computer-readable storage medium of claim 11, further comprising:
   generating the two-dimensional code according to the assigned network address of the exported file.

14. The non-transitory computer-readable storage medium of claim 11, wherein when the backup function of the electronic device is enabled, further comprising:
   logging in to a user account of the client;
   uploading the command to the back-end server according to the user account; and
   finding the information to be shared that is stored in the back-end server which is corresponding to the command according to the user account.

15. The non-transitory computer-readable storage medium of claim 11, wherein when the backup function of the electronic device is disabled, further comprising:
   exporting the information to be shared that is stored in the electronic device to obtain the exported file; and
   uploading the exported file, and store the exported file to the assigned network address.

* * * * *